United States Patent
Kim et al.

(10) Patent No.: US 10,308,221 B2
(45) Date of Patent: Jun. 4, 2019

(54) METHOD FOR PREVENTING RELAY ATTACK ON VEHICLE SMART KEY SYSTEM

(71) Applicant: SEOYON ELECTRONICS CO., LTD., Ansan-si, Gyeonggi-do (KR)

(72) Inventors: Gyu Ho Kim, Ansan-si (KR); Ju Min Kim, Ansan-si (KR); Shim Soo Kim, Ansan-si (KR)

(73) Assignee: SEOYON ELECTRONICS CO., LTD., Ansan-si, Gyeonggi-Do (Wonsi-Dong) (KR)

( * ) Notice: Subject to any disclaimer, the term of this patent is extended or adjusted under 35 U.S.C. 154(b) by 161 days.

(21) Appl. No.: 14/913,623

(22) PCT Filed: Oct. 4, 2013

(86) PCT No.: PCT/KR2013/008906
§ 371 (c)(1),
(2) Date: Feb. 22, 2016

(87) PCT Pub. No.: WO2015/026001
PCT Pub. Date: Feb. 26, 2015

(65) Prior Publication Data
US 2016/0200291 A1 Jul. 14, 2016

(30) Foreign Application Priority Data

Aug. 23, 2013 (KR) .................. 10-2013-0100604
Aug. 23, 2013 (KR) .................. 10-2013-0100605
(Continued)

(51) Int. Cl.
*B60R 25/24* (2013.01)
*B60R 25/20* (2013.01)
(Continued)

(52) U.S. Cl.
CPC ............ *B60R 25/246* (2013.01); *B60R 25/20* (2013.01); *B60R 25/24* (2013.01); *B60R 25/30* (2013.01);
(Continued)

(58) Field of Classification Search
CPC ............................... B60R 25/24; B60R 25/04
(Continued)

(56) References Cited

U.S. PATENT DOCUMENTS

| 7,791,457 B2 | 9/2010 | Ghabra et al. |
| 2004/0137877 A1 | 7/2004 | Crowhurst et al. |

(Continued)

FOREIGN PATENT DOCUMENTS

| CN | 102398566 A | 4/2012 |
| CN | 102587739 A | 7/2012 |

(Continued)

*Primary Examiner* — Redhwan K Mawari
*Assistant Examiner* — Rodney P King
(74) *Attorney, Agent, or Firm* — Birch, Stewart, Kolasch & Birch, LLP

(57) ABSTRACT

A method for preventing a relay attack of a smart key system for a vehicle according to the present invention accurately calculates a current spaced distance between an SMK unit and a fob key by using an RSSI included in a response signal and a current voltage level in a process of decoding the response signal when the fob key carried by a user receives a signal applied from the SMK unit installed in a vehicle and then transmits the response signal having at least two kinds of information to the SMK unit, and detects a challenge signal applied from the SMK unit installed in the vehicle and a noise signal included in the response signal, thereby enabling an operation of the vehicle only in a state where the carrier of the fob key secures a predetermined visual dis- (Continued)

tance from the vehicle, and more definitely preventing a third party from breaking into the vehicle through RF bi-directional authentication.

26 Claims, 10 Drawing Sheets

(30) Foreign Application Priority Data

Aug. 23, 2013 (KR) .......................... 10-2013-0100606
Aug. 23, 2013 (KR) .......................... 10-2013-0100607

(51) Int. Cl.
*B60R 25/30* (2013.01)
*G07C 9/00* (2006.01)
*H04L 29/06* (2006.01)
*H04W 12/06* (2009.01)

(52) U.S. Cl.
CPC ...... *G07C 9/00309* (2013.01); *H04L 63/1466* (2013.01); *H04W 12/06* (2013.01); *G07C 2009/00555* (2013.01); *G07C 2009/00793* (2013.01)

(58) Field of Classification Search
USPC ............................................. 701/2
See application file for complete search history.

(56) References Cited

U.S. PATENT DOCUMENTS

| | | |
|---|---|---|
| 2006/0255909 A1 | 11/2006 | Pavatich et al. |
| 2008/0024322 A1 | 1/2008 | Riemschneider et al. |
| 2010/0305779 A1* | 12/2010 | Hassan .................. G01C 17/38 701/2 |
| 2012/0286926 A1 | 11/2012 | Higemoto et al. |
| 2013/0196610 A1 | 8/2013 | Sanji et al. |

FOREIGN PATENT DOCUMENTS

| | | |
|---|---|---|
| EP | 1 288 841 A1 | 3/2003 |
| EP | 2 464 156 A1 | 6/2012 |
| JP | 2006-118887 A | 5/2006 |
| JP | 2006-342545 A | 12/2006 |
| JP | 2010-121297 A | 6/2010 |
| JP | 2011-52506 A | 3/2011 |
| JP | 2012-62651 A | 3/2012 |
| KR | 10-1283623 B1 | 7/2013 |
| WO | WO 99/59284 A2 | 11/1999 |
| WO | WO 02/17238 A1 | 2/2002 |
| WO | WO 2004/068419 A1 | 8/2004 |

\* cited by examiner

METHOD FOR PREVENTING RELAY ATTACK ON VEHICLE SMART KEY SYSTEM

CROSS REFERENCE TO RELATED APPLICATIONS

This application is the National Phase of PCT International Application No. PCT/KR2013/008906, filed on Oct. 4, 2013, which claims priority under 35 U.S.C. 119(a) to Patent Application Nos. 10-2013-0100604, 10-2013-0100605, 10-2013-0100606 and 10-2013-0100607, filed in the Republic of Korea on Aug. 23, 2013, all of which are hereby expressly incorporated by reference into the present application.

TECHNICAL FIELD

The present invention relates to a method for preventing a relay attack of a smart key system of a vehicle, and more particularly, to a method for preventing a relay attack of a smart key system of a vehicle, which is capable of preventing a third party from breaking into the vehicle when a user carrying a fob key is located at a position at a predetermined distance or more, at which the user cannot recognize the vehicle with the eyes.

BACKGROUND ART

In general, a smart key system for a vehicle refers to a system for preventing a vehicle from being robbed by allowing various functional operation units of a vehicle body to be operated only when a driver (or a user) carries a fob key and a smart key unit (hereinafter, referred to as an SMK unit) authorizes that the driver (or the user) is an authorized user by decoding an encoding code applied from the fob key.

That is, when the user approaches the vehicle within a predetermined distance while carrying the fob key, the SMK unit wakes up the fob key, performs a procedure of authorizing an ID of the authorized user by mutually communicating encoding data of a transponder embedded in the fob key, and then switches operations of various functional operation units, such as starting an engine of the vehicle, opening/closing a trunk door, and opening/closing of a side door, to be operable when it is determined that the user is the authorized user.

However, when the side door is opened, a signal transfer system may be divided into two situations as described below. That is, the first case is a case where the SMK unit authorizes the authorized user ID, and then the user presses a switch related to an operation of the side door among the operation switches of the various functional operation units provided in the fob key and transmits a predetermined signal to the SMK unit, and the second case is a case where the SMK unit authorizes the authorized user ID, and then the user actively pulls a knob of the side door and transmits a triggering signal generated from the knob of the side door to the SMK unit.

In the meantime, the authorized user ID authorizing process performed between the SMK unit and the fob key in the smart key system in the related art will be briefly described below.

First, when the fob key approaches the vehicle within a predetermined distance or directly pulls the knob of the side door, a challenge signal is generated, and the generated challenge signal is modulated and demodulated by the SMK unit and is received by an LF receiver of the fob key.

When the fob key receives the challenge signal, a response signal including an encoding code is transmitted by using an RF transmitter of the fob key, the RF receiver of the SMK unit receives the response signal and determines whether the response signal is matched with a predetermined encoding code, and then enables the functional operation unit to be operated based on the fob key carried by the authorized user only when the response signal is matched with the predetermined encoding code.

However, even in a case where the user actually carrying the fob key goes beyond a predetermined distance (for example, a maximum visual distance, at which the driver views the vehicle) from the vehicle, the smart key system in the related art maintains a state in which a third party is capable of operating the various functional operation units when a normal challenge signal is transmitted to the fob key from the vehicle (which is referred to as a "relay attack"), so that there is a problem in that the vehicle or equipment stored in the vehicle may be robbed.

Particularly, in theory, when the fob key carried by the authorized user goes beyond a predetermined distance (a challenge signal reaching distance) from the vehicle, the fob key cannot receive the challenge signal, the aforementioned response signal including the encoding code itself is not transmitted, so that there may be no problem, but when a plurality of repeaters (a repeater 1 and a repeater 2) having an unlawful intention is provided between the vehicle and the fob key of the authorized user, there still occurs a problem in that a third party may break into the vehicle.

DISCLOSURE

Technical Problem

The present invention is conceived to solve the aforementioned technical problems, and has an object to provide a method for preventing a relay attack of a smart key system for a vehicle, which is capable of preventing a third party from breaking into a vehicle through a repeater.

Technical Solution

An exemplary embodiment of the present invention provides a method for preventing a relay attack of a smart key system for a vehicle, including: a challenge signal receiving operation of receiving, by a fob key carried by a user, a challenge signal applied from a smart key unit (hereinafter, referred to as an "SMK unit") installed in a vehicle; a response signal transmitting operation of transmitting, by the fob key, a response signal including an encoding code to the SMK unit after the challenge signal receiving operation; a response signal receiving operation of receiving, by the SMK unit, the response signal after the response signal transmitting operation; a first attack signal detecting operation of detecting a noise signal included in the response signal received by the SMK unit after the response signal receiving operation; and a functional operation unit operation controlling operation of controlling operations of various functional operation units installed in the vehicle according to a decoding result by the first attack signal detecting operation.

Specific items of other exemplary embodiments are included in the detailed description and the drawings.

Advantageous Effects

The method for preventing the relay attack of the smart key system for the vehicle according to the present invention has an effect of preventing a third party from breaking into a vehicle by disallowing the performance of a next operation to be performed when a noise signal, other than a normal signal, is included in a response signal and a challenge signal.

BEST MODE

Hereinafter, exemplary embodiments of a method for preventing a relay attack of a smart key system for a vehicle according to the present invention will be described in detail with reference to the accompanying drawings.

A vehicle, to which the method for preventing the relay attack of the smart key system for the vehicle according to the present invention is applied, is installed with a smart key unit (hereinafter, referred to as an "SMK unit"), which controls operations of various functional operation units installed in a vehicle body according to various electric signals applied by an operation of a switch installed in the vehicle body or an operation of a portable terminal.

The SMK unit serves to control operations of various functional operation units, such as an engine, a transmission; and an air conditioning component, installed in the vehicle body, and the switch installed in the vehicle body may include, for example, a push-type starting switch, a side door handle, and a trunk opening/closing switch, and the portable terminal may include a fob key or a smart key, which will be described below.

A motive of exemplary embodiments of the method for preventing the relay attack of the smart key system for the vehicle according to the present invention is a communication method between a vehicle equipped with the SMK unit and a fob key, which is formed to have size small enough to be carried by a driver (or a user) and mutually communicates with the SMK unit by a wireless communication method. It is a matter of course that the fob key is a sort of aforementioned portable terminal.

Figure 1:
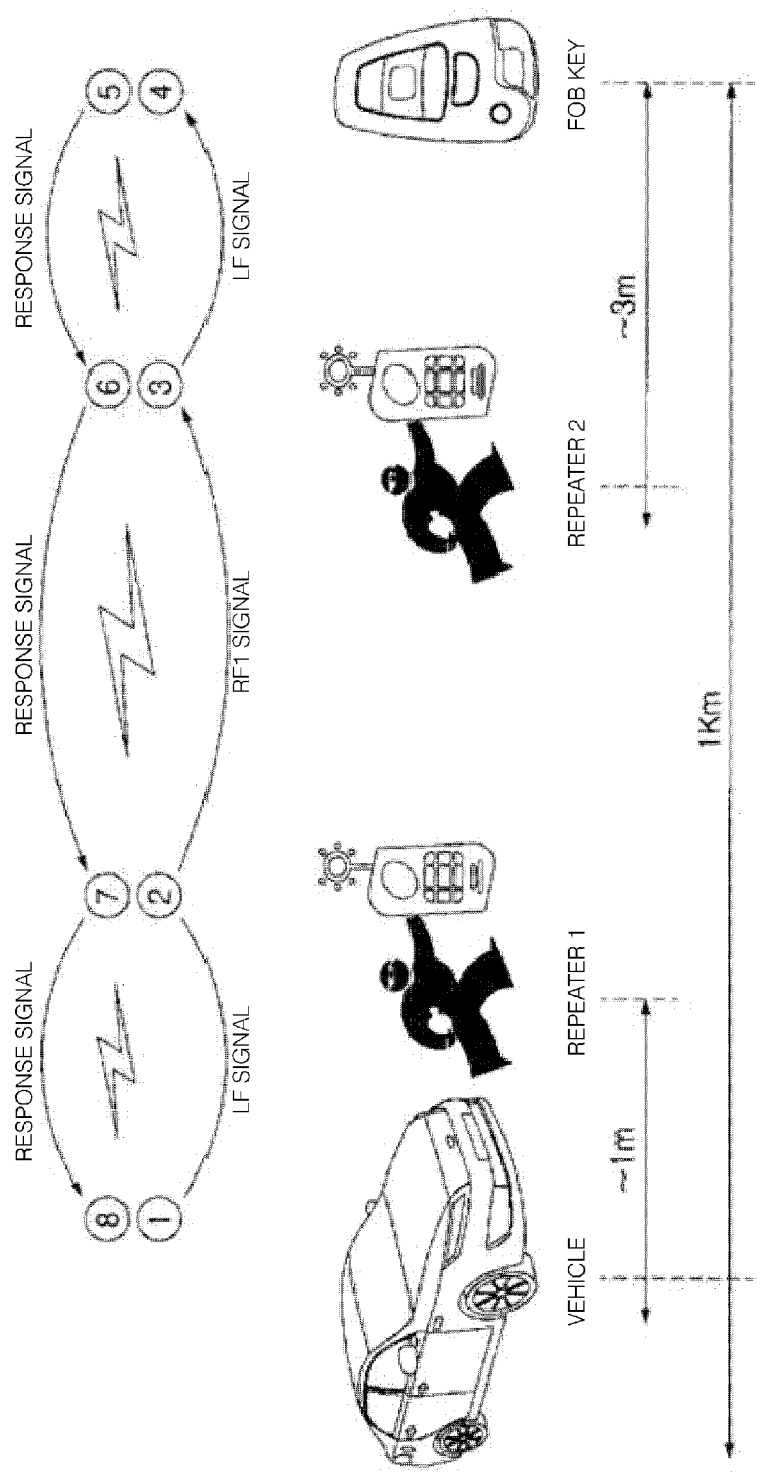
FIG. 1 is a schematic diagram illustrating a state where a passive entry is available between a fob key and a smart key (SMK) unit during a door handle triggering operation.
Figure 2:
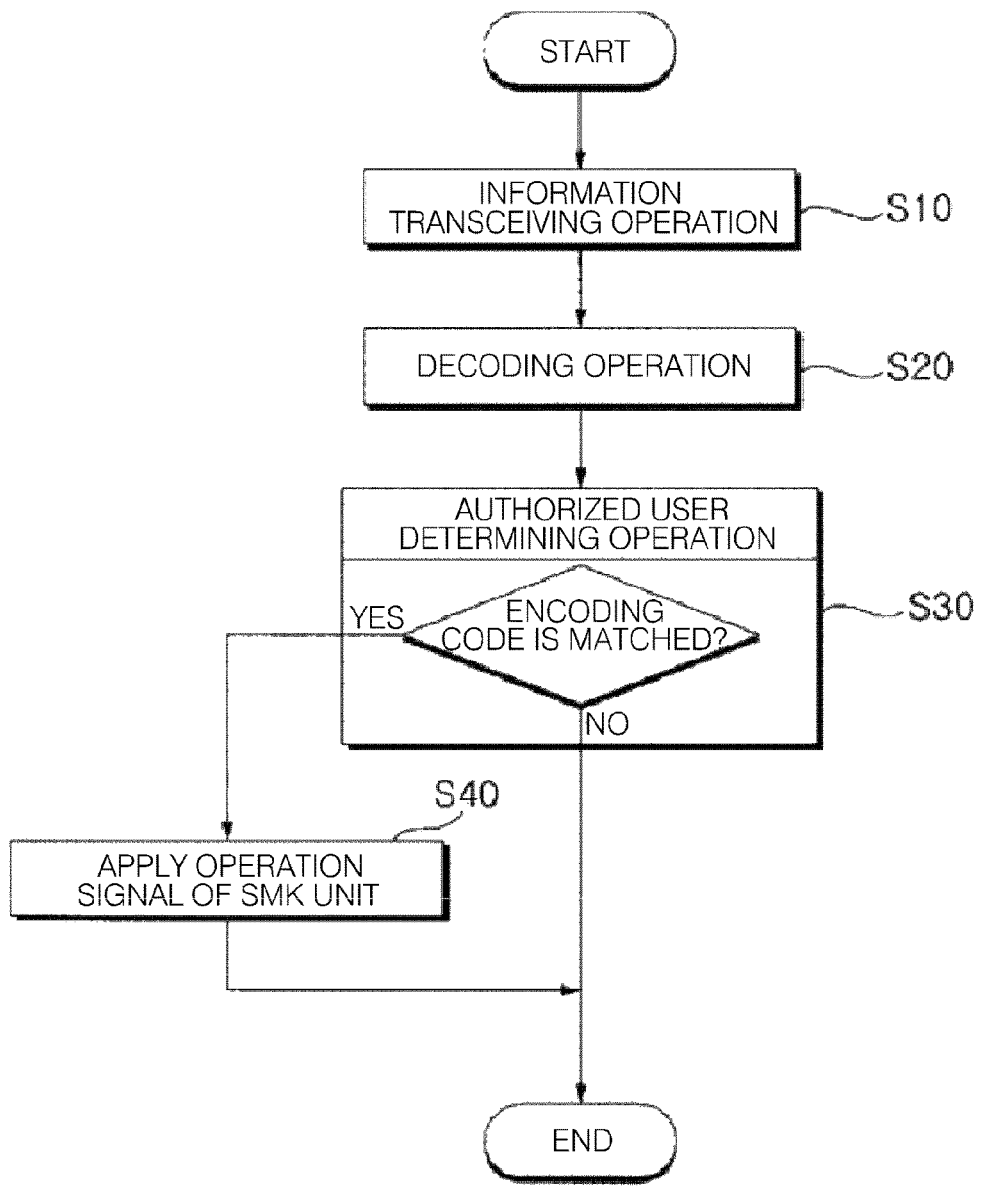
FIG. 2 is a block diagram illustrating a general sequence of a method for preventing a relay attack of a smart key system for a vehicle according to the present invention.

FIG. 1 is a schematic diagram illustrating a state where a passive entry is available between the fob key and the SMK unit during a door handle triggering operation, and FIG. 2 is a block diagram illustrating a general sequence of the method for preventing the relay attack of the smart key system for the vehicle according to the present invention.

An outline of a communication method for a smart key system will be briefly described. When a user approaches a vehicle, in which the SMK unit is disposed, within a predetermined distance while carrying the fob key, the fob key wakes up, an LF signal is generated by an operation of pulling, by the user, a side door handle installed in a vehicle body (hereinafter, such an action is referred to as "door handle triggering") or an action of operating a plurality of switch buttons provided in the fob key (①), the generated LF signal is modulated/demodulated and transmitted to the fob key (③→④), and the fob key transmits a response signal to the SMK unit in a form of a response to the LF signal (⑤→⑥, ⑦→⑧). This may be broadly referred to as an information transceiving operation S10.

Here, a repeater 1, which is closely disposed to the SMK unit, and a repeater 2, which is closely disposed to the fob key, substantially serve to extend a communication distance between the SMK unit and the fob key (②→③, ⑥→⑦).

The SMK unit decodes an encoding code and various information included in the response signal. This may be broadly referred to as a decoding operation S20, and the decoding operation S20 may be performed by the fob key, as well as the SMK unit, which will be described below.

In the meantime, after the decoding operation S20, it is determined whether the user carrying the fob key is an authorized user by determining whether a predetermined encoding code is matched with related data. This may be broadly referred to as an authorized user determining operation S30.

A case where the outline of the communication method for the smart key system for the vehicle is normally applied to a vehicle body is a case where a spaced distance between the SMK unit and the fob key is within a distance limit range, within which the SMK unit authorizes that the user is the authorized user by mutually wirelessly communicating with the fob key. In general, when only the spaced distance within the distance limit range is maintained, the SMK unit may determine whether the user is the authorized user, and various functional operation units of the vehicle become in operable states even by a third party, who does not carry the fob key. In this case, the distance limit may be generally set to be a visual distance or less, at which the carrier of the fob key is capable of viewing the vehicle, but the problem is that the distance limit is set in the SMK unit in advance, so that the distance limit may be extended up to a range, in which the carrier of the fob key cannot view the vehicle depending on cases.

That is, as illustrated in FIG. 1, the LF signal generated by the triggering of the door handle may be transmitted to the fob key through two or more repeaters (hereinafter, a repeater 1 10 and a repeater 2 20) positioned between the SMK unit and the fob key, and induce the fob key to transmit the response signal, so that even if the fob key is actually spaced out of the visual distance from the vehicle, a passive entry and a passive start by the door handle triggering by the third party are available (which is typically referred to as "a relay attack in the smart key system").

For example, a distance, in which the repeater 1 10 is capable of receiving the LF signal generated by the door handle triggering and the LF signal may be modulated/demodulated into an RF1, is 1 m or less, which is short, and a distance, at which the fob key is capable of receiving the LF signal modulated/demodulated by the repeater 2 20 is 3 m or less, which is also short, but a distance, at which the modulated/demodulated RF1 signal may be transmittable through the two repeaters 10 and 20, is relatively long, and a distance, at which the SMK unit is capable of receiving the response signal transmitted by the fob key, is also relatively long (within approximately 1 Km), so that when the door handle triggering is generated, the carrier of the fob key already is already beyond the visual distance range, in which the carrier of the fob key is capable of viewing the vehicle.

Transception antennas 15 and 25 for the mutual communication of the repeaters 10 and 20 may be provided between the two repeaters 10 and 20.

The present invention provides various exemplary embodiments for avoiding the relay attack in the smart key system.

Figure 3:
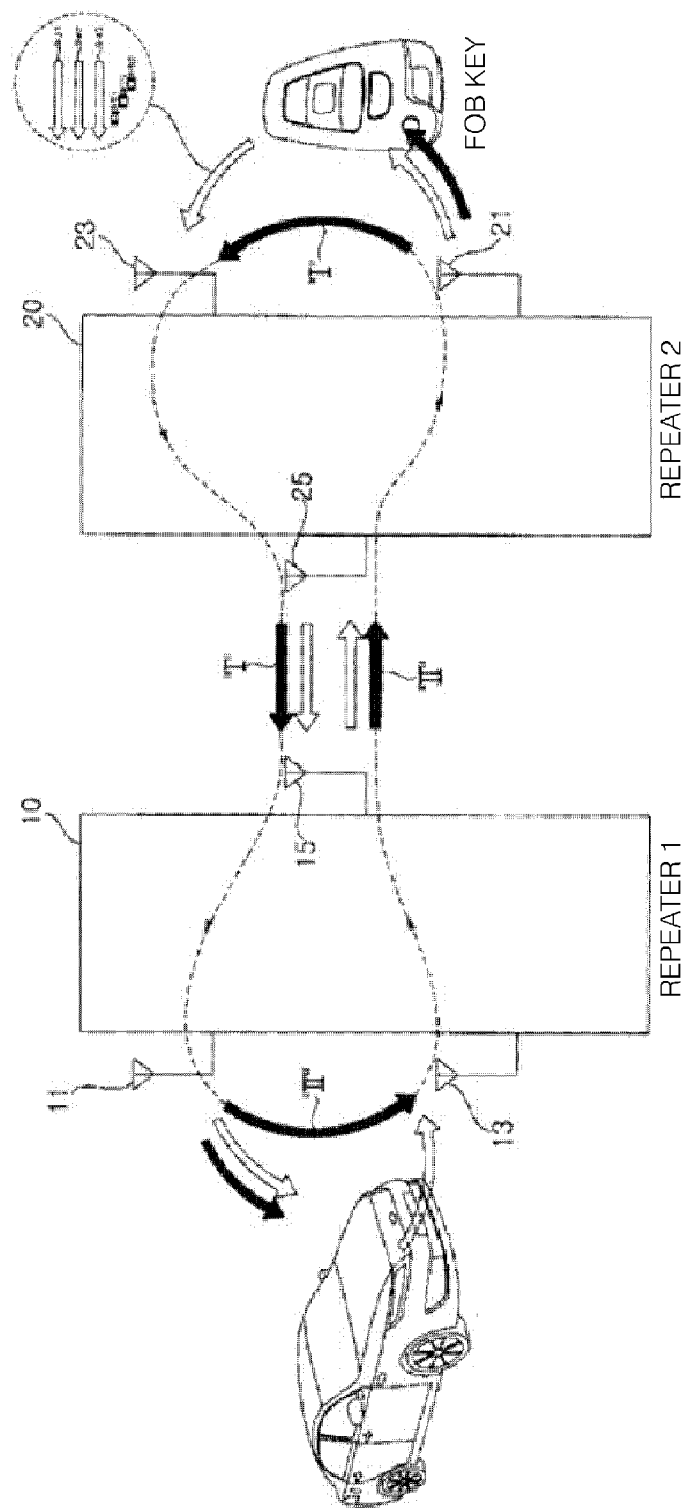
FIG. 3 is a schematic diagram illustrating an operation state of a first exemplary embodiment of the method for preventing the relay attack of the smart key system for the vehicle according to the present invention.
Figure 4:
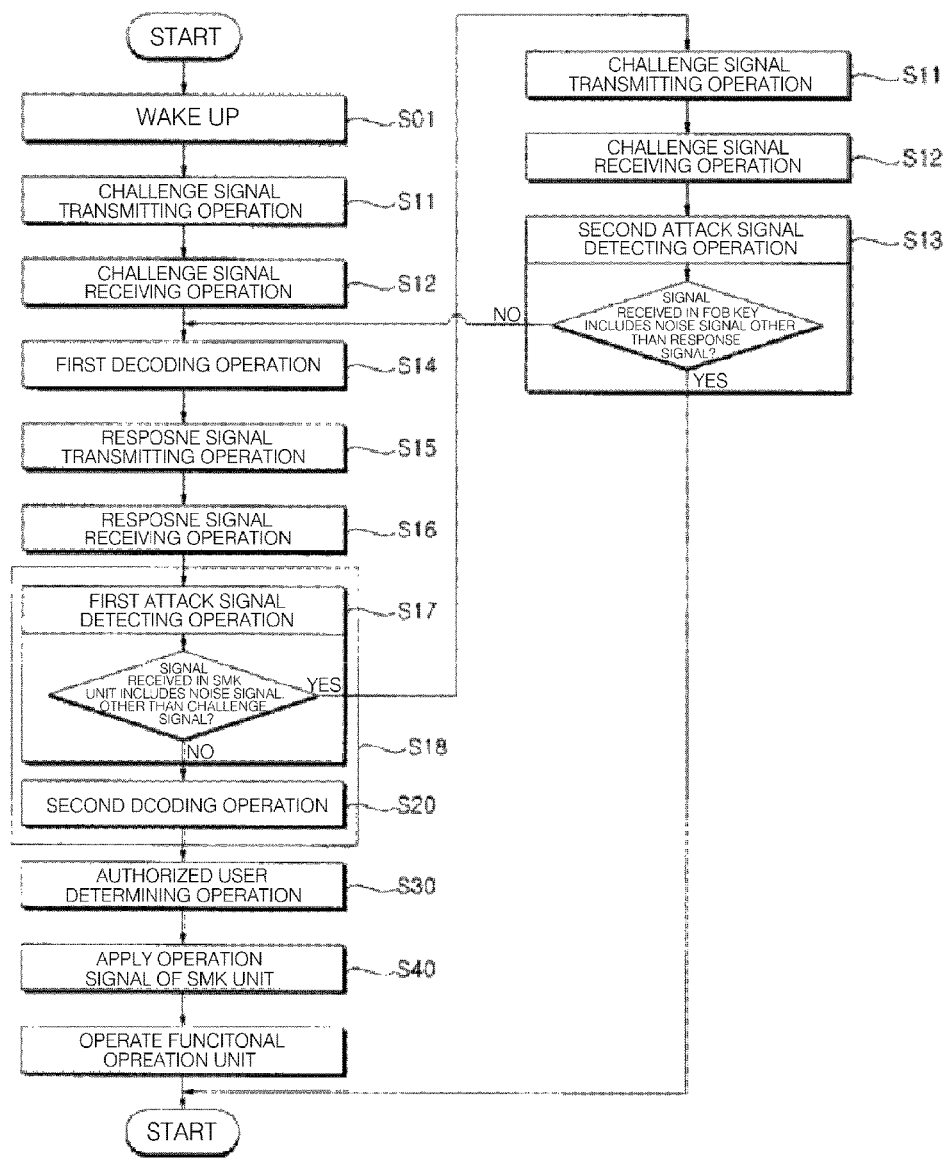
FIG. 4 is a detailed block diagram of FIG. 3.

FIG. 3 is a diagram illustrating an operation state of a first exemplary embodiment of the method for preventing the relay attack of the smart key system for the vehicle according to the present invention, and FIG. 4 is a detailed block diagram of FIG. 3.

As referred in FIGS. 3 and 4, the method for preventing the relay attack of the smart key system for the vehicle according to the first exemplary embodiment includes a challenge signal transmitting operation S11 of transmitting a challenge signal modulated/demodulated by an SMK unit installed in a vehicle to a fob key carried by a user, a challenge signal receiving operation S12 of receiving, by the fob key, the challenge signal transmitted in the challenge signal transmitting operation S11, and a response signal transmitting operation S15 of transmitting, by the fob key, a response signal including an encoding code to the SMK unit after the challenge signal receiving operation S12.

Here, the challenge signal is a signal for requesting the fob key in a wake-up state to transmit data, such as the encoding code, for identifying a user to the SMK unit, and the response signal is a signal in a form of a response to the challenge signal.

The method for preventing the relay attack of the smart key system for the vehicle according to the first exemplary embodiment may further include a second decoding operation S20 of decoding the response signal received by the SMK unit after the response signal transmitting operation S15, and a first attack signal detecting operation S17 of detecting a noise signal I included in the response signal simultaneously with the second decoding operation S20.

When the second decoding operation S20 and the first attack signal detecting operation S17 are sequentially determined, it may be interpreted that the second decoding operation S20 is included in the first attack signal detecting operation S17 in that whether the noise signal I is detected in the response signal needs to be substantially first determined before decoding the encoding code included in the response signal. Hereinafter, the first attack signal detecting operation including the second decoding operation S20 will be described with an assigned reference numeral "S18".

However, the second decoding operation S20 is not a concept essentially included in the first attack signal detecting operation S17, and when the noise signal I is detected in the response signal in the first attack signal detecting operation S17, it may be considered that the second decoding operation S20 is not included in the first attack signal detecting operation S17 within a limit in which the second decoding operation S20 does not need to be operated.

As referred in FIG. 3, the noise signal I included in the response signal is one of the signals transmitted for transmitting the challenge signal received from the SMK unit to the fob key by the repeater 2 20, which is closely positioned to the fob key between the two repeaters (the repeater 1 10 and the repeater 2 20) attempting the relay attack, in the smart key system between the SMK unit installed in the vehicle and the fob key.

More particularly, the repeater 1 10 is positioned to be close to the SMK unit of the vehicle, and the first reception antenna 13 is provided for receiving the challenge signal transmitted from the SMK unit in the challenge signal transmitting operation S11, instead of the fob key, and a first transmission antenna 11 is provided for transmitting the response signal transmitted in the response signal transmitting operation S15 to the SMK of the vehicle unit through the repeater 2 20. Similarly, the repeater 2 20 is positioned to be close to the fob key, and a second transmission antenna 21 is provided for transmitting the challenge signal transmitted in the challenge signal transmitting operation S11 to the fob key through the repeater 1 10, and a second reception antenna 23 is provided for receiving the response signal transmitted from the fob key in the response signal transmitting operation S15, instead of the SMK unit.

Here, the noise signal I included in the response signal is the challenge signal transmitted from the second transmission antenna 21 of the repeater 2 20, and may be the challenge signal received by the second reception antenna 23 together with the response signal transmitted from the fob key for the performance of the response signal transmitting operation S15.

The method for preventing the relay attack of the smart key system for the vehicle according to the first exemplary embodiment may further include a functional operation unit operation controlling operation (a reference numeral of which is not denoted) of controlling operations of various functional operation units installed in the vehicle according to a result of the decoding in the first attack signal detecting operation S18.

Here, the noise signal I included in the response signal detected in the first attack signal detecting operation S18 includes the response signal, and is the LF signal transmitted from the vehicle through the door triggering by a third party and is a signal requesting the response signal from the fob key. The signal is a signal, which is transmitted through the second transmission antenna 21 of the repeater 2 20 and is directly received through the second reception antenna 23 of the repeater 2 20.

Further, the noise signal I included in the response signal detected in the first attack signal detecting operation S18 may be defined as a signal having the same frequency band as that of the response signal. In general, in order for the repeater 2 20 to obtain the response signal from the fob key, the second transmission antenna 21 and the second reception antenna 23 are provided so as to transceive a signal having the same frequency band as the frequency band between the fob key and the SMK unit.

That is, the noise signal I detected in the first attack signal detecting operation is a signal transmitted for the purpose of being transmitted to the fob key from the second transmission antenna 21 of the repeater 2 20 adjacent to the fob key between the two repeaters 10 and 20 and directly received in the second reception antenna 23 without passing through the fob key, and is the challenge signal having the same frequency band as that of the response signal.

Here, the second transmission antenna 21 of the repeater 2 20 is the challenge signal transmission antenna, and the second reception antenna 23 of the repeater 2 20 is the response signal reception antenna.

The functional operation unit operation controlling operation is an operation of controlling an operation of the functional operation unit to be blocked even when the encoding code included in the response signal is matched with pre-stored codes in a case where the response signal received in the SMK unit includes the noise signal I.

However, in the functional operation unit operation controlling operation, it is not essentially necessary to confirm whether the encoding code is matched, and when the response signal includes the noise signal I, the response signal may be recognized as a distorted signal and thus the performance of a next operation (for example, the second decoding operation S20) may be set to be blocked.

That is, the case where the noise signal I is included in the response signal needs to be considered as a case where the two repeaters 10 and 20 having an unlawful intention of attempting to break into the vehicle are finally provided, so that in this case, in order to block the breaking-into the vehicle, the operation of the functional operation unit needs to be stopped.

In the meantime, as referred in FIGS. 3 and 4, the method for preventing the relay attack of the smart key system for the vehicle according to the first exemplary embodiment may further include a second attack signal detecting operation S13 of detecting a noise signal II included in the challenge signal received by the fob key after the challenge signal receiving operation S12 and before the response signal transmitting operation S15.

As referred in FIG. 3, the noise signal II included in the challenge signal is one of the signals transmitted for transmitting the response signal received from the fob key to the SMK unit by the repeater 1 10, which is closely positioned to the SMK unit between the two repeaters (the repeater 1 10 and the repeater 2 20) attempting the relay attack, in the smart key system between the SMK unit installed in the vehicle and the fob key.

Here, the noise signal II included in the challenge signal is the response signal transmitted from the first transmission antenna 11 of the repeater 1 10, and may be the response signal received by the second reception antenna 23 together with the challenge signal transmitted from the SMK unit for the performance of the challenge signal transmitting operation S11.

The noise signal II included in the challenge signal detected in the second attack signal detecting operation S13 may be defined as a signal having the same frequency band as that of the challenge signal. In general, in order for the repeater 1 10 to obtain the challenge signal from the SMK unit, the first transmission antenna 11 and the first reception antenna 13 are provided so as to transceive a signal having the same frequency band as the frequency band between the fob key and the SMK unit.

That is, the noise signal II detected in the second attack signal detecting operation is a signal transmitted for the purpose of being transmitted to the SMK unit from the first transmission antenna 11 of the repeater 1 10 adjacent to the SMK unit between the two repeaters 10 and 20 and directly received in the first reception antenna 13, and is the response signal having the same frequency band as that of the response signal.

Here, the first transmission antenna 11 of the repeater 1 10 is the response signal transmission antenna, and the first reception antenna 13 of the repeater 1 10 is the challenge signal reception antenna.

When the challenge signal received before the response signal transmitting operation S15 includes the noise signal II detected in the second attack signal detecting operation S13, the fob key does not perform the response signal transmitting operation S15 so as not to transmit the response signal.

The method for preventing the relay attack of the smart key system for the vehicle according to the first exemplary embodiment may further include a first decoding operation S14 of decoding the modulated/demodulated data included in the challenge signal before the response signal transmitting operation S15, but when the noise signal II is detected in the second attack signal detecting operation S13 even in a case where the data decoded in the first decoding operation S14 is matched with pre-stored data, the fob key does not also perform the response signal transmitting operation S15. However, the first decoding operation S14 does not need to be essentially performed, and in a case where the challenge signal includes the noise signal II, the operations subsequent to the first decoding operation S14 may be set not to be performed from the first time.

Accordingly, according to the method for preventing the relay attack of the smart key system for the vehicle according to the first exemplary embodiment, even in the case where the two repeaters 10 and 20 having the unlawful intention are located between the SMK unit and the fob key, it is possible to prevent a third party from breaking into the vehicle by actively sensing the two repeaters 10 and 20.

More particularly, in the related art, a so-called authentication system for "LF uni-directional authentication and RF uni-directional authentication", in which when a third party triggers a door, it is set that the fob key wakes up by an LF signal transmitted from the SMK unit and simultaneously determines only whether a modulated and demodulated signal included in the LF signal is normal, so that the fob key transmits an RF signal corresponding to a response signal, and the SMK unit receives the RF signal and determines whether the RF signal is normal, is established, but the smart key system for the vehicle according to the present invention provides a more enhanced means for preventing a third party from breaking into a vehicle by newly establishing, a so-called authentication system for "LF uni-directional authentication and RF bi-directional authentication", in which the noise signals I and II included in the RF signals generated by the repeater 1 and the repeater 2 provided between the SMK unit and the fob key are actively detected.

The addition of the authentication system for the RF bi-directional authentication has an advantage of making it more difficult for a third party to break into the vehicle by inducing the configurations of the first repeater and the repeater 2 to become more complex.

Figure 5:
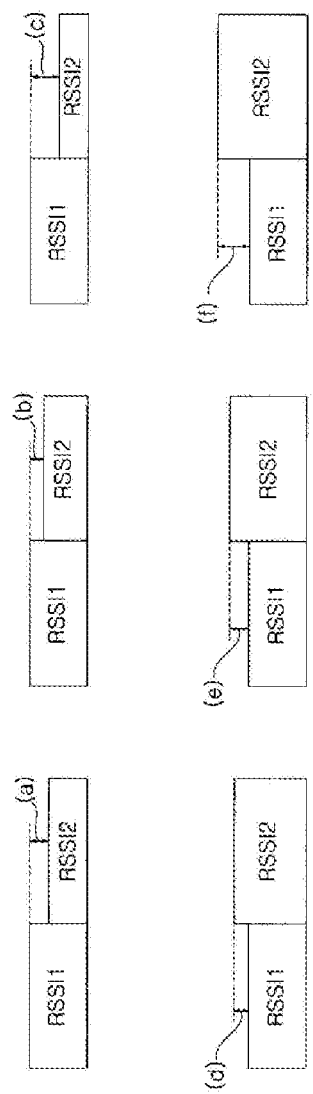
FIG. 5 is a schematic diagram illustrating an operational state of FIG. 3.
Figure 6:
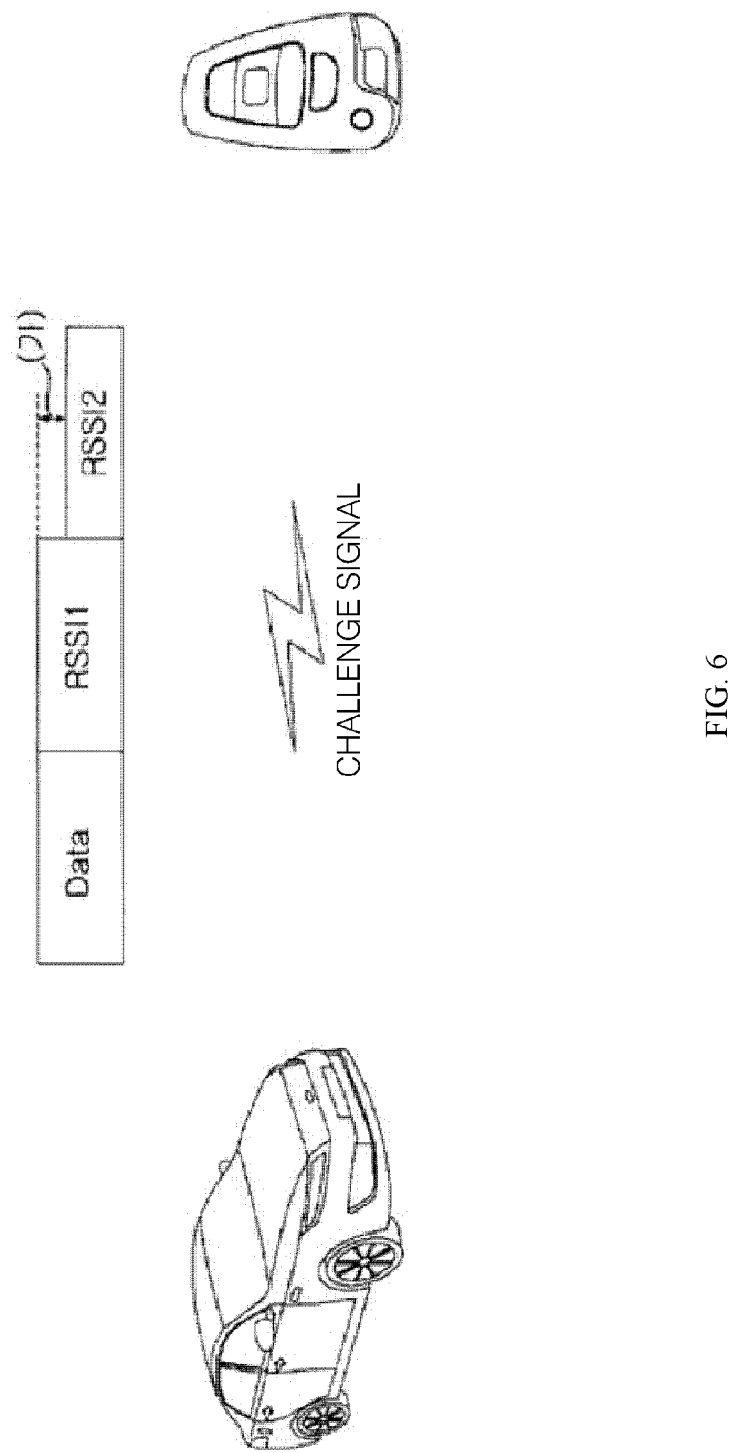
FIG. 6 is an example table of map data stored in the SMK unit.

FIG. 5 is a schematic diagram illustrating an operational state of FIG. 3, and FIG. 6 is an example table of map data stored in the SMK unit A second exemplary embodiment of the method for preventing the relay attack of the smart key system for the vehicle according to the present invention provides a means for preventing a third party from breaking into a vehicle, which is further improved compared to the basic concept of the first exemplary embodiment.

More particularly, the second exemplary embodiment of the method for preventing the relay attack of the smart key system for the vehicle according to the present invention is conceived to prevent a possibility of a robbery of a vehicle and equipment from a third party by making a carrier of the fob key pass through the authorized user authentication process only within a visual distance, at which the carrier is capable of directly viewing the vehicle as possible.

That is, as referred in FIGS. 2 and 4, the second exemplary embodiment of the method for preventing the relay attack of the smart key system for the vehicle according to the present invention may include a challenge signal receiving operation S12 of receiving, by the fob key carried by a user, a challenge signal applied from the SMK unit installed in the vehicle, a first decoding operation S14 of decoding, by the fob key, a modulated/demodulated signal of the received challenge signal after the challenge signal receiving operation S12, a response signal transmitting operation S15 of transmitting, by the fob key, a response signal including at least two kinds of information to the SMK unit in a form of a response to the challenge signal, a second decoding operation S20 of decoding, by the SMK unit, the received response signal after the response signal transmitting operation S15, and an authorized user determining operation S30 of calculating a current spaced distance between the vehicle and the fob key and then determining whether a passive operation signal applied from the door of the vehicle, other than the fob key, is normal by using a decoding result of the second decoding operation S20.

Here, the response signal, which the fob key transmits in the form of a response to the LF signal, includes at least two kinds of information, and the information may include information on a received signal strength indicator (hereinafter, referred to as an "RSSI") and a current voltage level (hereinafter, referred to as a "VL") of the fob key.

The response signal may further include an encoding code transmitted by the fob key for the authorized user authentication in the authorized user determining operation S30, as well as the RSSI and the VL.

The encoding code is data, which is received by the SMK unit and is compared with an encoding code pre-stored in the SMK unit, so as to recognize whether the carrier carrying the fob key is the authorized user.

In the meantime, the VL includes information about two cases including information in a case where the VL is equal to or larger than a predetermined voltage and information in a case where the VL is smaller than the predetermined voltage, and the RSSI includes two kinds of information including information in a case where the RSSI is equal to or larger than a predetermined indicator and information in a case where the RSSI is smaller than the predetermined indicator, so that the VL and the RSSI are applied for calculating the current spaced distance between the vehicle and the fob key in the authorized user determining operation.

More particularly, first, when the RSSI is equal to or larger than the predetermined indicator, it is determined that the current spaced distance between the vehicle and the fob key is short (near), so that a passive operation signal may be determined to be generated by the authorized user, and when the RSSI is smaller than the predetermined indicator, it is determined that the current spaced distance between the vehicle and the fob key is long (far), so that the passive operation signal may be determined to be generated by a non-authorized user.

However, even if the RSSI is the same, the calculated current spaced distance may be different from the actual spaced distance. For example, the reason is that in a case where the VL is equal to or larger than the predetermined voltage (here, the predetermined voltage is set to "3 V"), when the RSSI is equal to or larger than the predetermined indicator, it may be determined that the current spaced distance is short (near), but in a case where the RSSI is smaller than the predetermined indicator, even when the VL is equal to or larger than the predetermined voltage, it may be determined that the current spaced distance is long (far), and in contrast to this, even in a case where the VL is smaller than the predetermined voltage, when the RSSI is equal to or larger than the predetermined indicator, it may be determined that the current spaced distance is short (near), and even in a case where the VL is equal to or larger than the predetermined voltage, when the RSSI is smaller than the predetermined indicator, it may be determined that the current spaced distance is long (far).

In the second exemplary embodiment of the smart key system for the vehicle according to the present invention, in order to more accurately calculate the current spaced distance, the response signal transmitted from the fob key in the form of the response to the LF signal is transmitted to the SMK unit based on each of the divided cases, in which the RSSI is equal to or larger than the predetermined indicator and is smaller than the predetermined indicator, and the VL is equal to or larger than the predetermined voltage and is smaller than the predetermined voltage, in order to more accurately calculate the current spaced distance.

Here, the predetermined indicator (hereinafter, referred to as "a first predetermined indicator") of the RSSI in a case where the VL is equal to or larger than the predetermined voltage may have a different value from that of the predetermined indicator (hereinafter, referred to as "a second predetermined indicator") of the RSSI in a case where the VL is smaller than the predetermined voltage.

The first predetermined indicator may be set to have a larger value than that of the second predetermined indicator. Then, in the case where the VL is equal to or larger than the predetermined voltage, compared to the case where the VL is smaller than the predetermined voltage, when the RSSI has the value of the first predetermined indicator, which is larger than the value of the second predetermined indicator, at the least, it may be determined that the current spaced distance between the vehicle and the fob key is short. By contrast, in the case where the VL is smaller than the predetermined voltage, compared to the case where the VL is equal to or larger than the predetermined voltage, when the RSSI has the value of the second predetermined indicator, which is smaller than the value of the first predetermined indicator, it is determined that the current spaced distance between the vehicle and the fob key is short, so that it is possible to prevent an erroneous operation by the short spaced distance in a case where the remaining capacity of a battery of the fob key is small.

The predetermined voltage is linearly varied based on the RSSI, and the first predetermined indicator and the second predetermined indicator are also variables, which are varied in proportion to the predetermined voltage, and are stored in the SMK unit as map data.

Accordingly, the current spaced distance between the vehicle and the fob key calculated in the authorized user determining operation S30 is calculated as a short distance (near) when the RSSI is equal to or larger than the first predetermined indicator or the second predetermined indicator and is calculated as a long distance (far) when the RSSI is smaller than the first predetermined indicator or the second predetermined indicator, and in the authorized user determining operation S30, only when the current spaced distance between the vehicle and the fob key is calculated as the short distance (near), the passive operation signal is determined to be normal, and when the current spaced distance between the vehicle and the fob key is calculated as the long distance (far), the passive operation signal is determined to be abnormal.

An application process of the smart key system of the vehicle according to the second exemplary embodiment of the present invention configured as described above will be described below.

First, as referred in FIG. 2, when triggering of a door handle is generated by a carrier carrying a fob key or a third party, who does not carry the fob key, an SMK unit of a vehicle generates an LF signal, modulates and demodulates the generated LF signal, and transmits the modulated and demodulated LF signal to the fob key.

The fob key receiving the LF signal transmits a response signal to the SMK unit in a form of a response, and the SMK unit receiving the response signal decodes information included in the response signal, compares a pre-stored encoding code with the received encoding code data, and then releases the locking of the side door only when the pre-stored encoding code is matched with the received encoding code data.

Here, the response signal includes a received signal strength indicator (RSSI) and a battery level (VL) indicating the current residual capacity of the battery, so that it is possible to prevent a relay attack when the carrier of the fob key actually deviates from a visual distance range of the vehicle by calculating the current spaced distance between the vehicle and the fob key.

Figure 7:
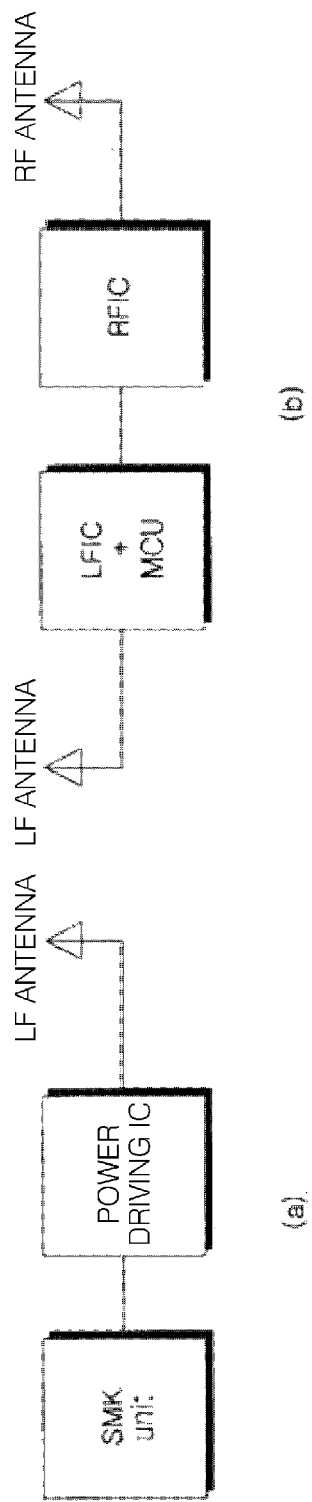
FIG. 7 is a schematic diagram illustrating configurations of the fob key and the SMK unit for applying a third exemplary embodiment of the method for preventing the relay attack of the smart key system for the vehicle according to the present invention.
Figure 8:
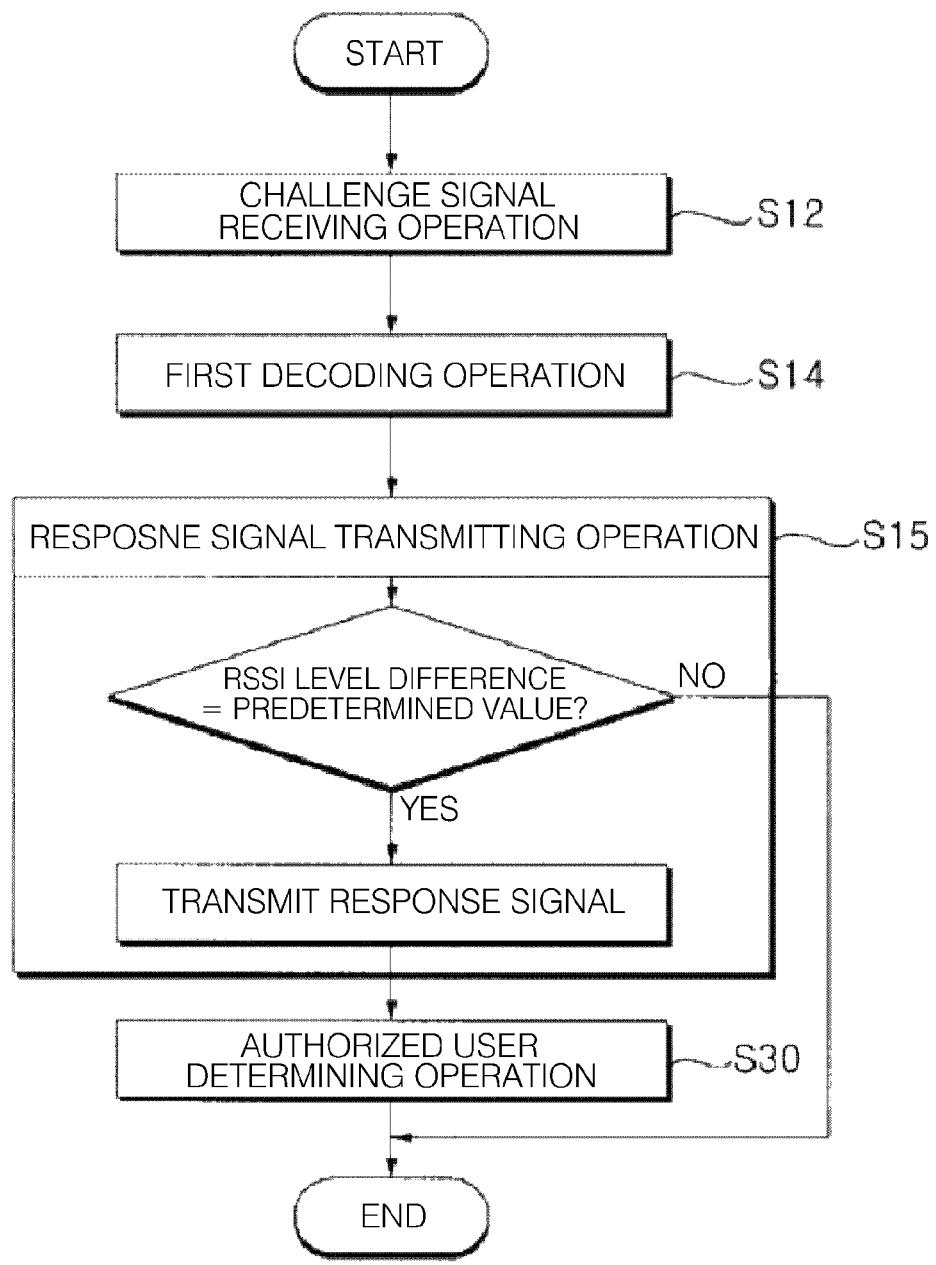
FIG. 8 is a block diagram illustrating a process of controlling the method for preventing the relay attack of the smart key system for the vehicle according to a second exemplary embodiment.
Figure 9:
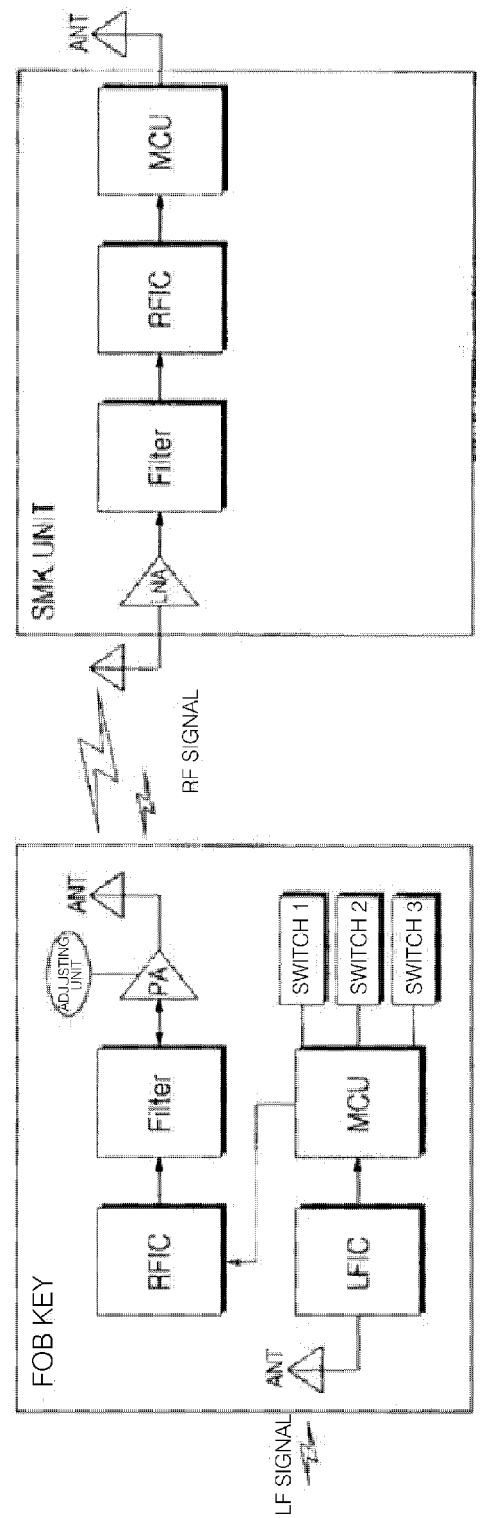
FIG. 9 is a diagram illustrating configurations of the fob key and the SMK unit for applying a third exemplary embodiment of the method for preventing the relay attack of the smart key system for the vehicle according to the present invention.

FIG. 7 is a schematic diagram illustrating configurations of the fob key and the SMK unit for applying a third exemplary embodiment of the method for preventing the relay attack of the smart key system for the vehicle according to the present invention, and FIG. 8 is a block diagram illustrating a process of controlling the method for preventing the relay attack of the smart key system for the vehicle according to the third exemplary embodiment.

The third exemplary embodiment of the method for preventing the relay attack of the smart key system for the vehicle according to the present invention provides a means for preventing a third party from breaking into a vehicle, which is further improved compared to the basic concept of the first exemplary embodiment.

More particularly, the method for preventing the relay attack of the smart key system for the vehicle according to the third exemplary embodiment may additionally have a main characteristic that the response signal receiving operation may include a signal determining process of determining whether the challenge signal received in the SMK unit is generated by an LF signal generated by the triggering of the door handle or an RF signal input by the operation of the plurality of switches provided in the fob key, and an output level of the response signal is controlled to be different according to the kind of signal determined in the signal determining process, that is, the kind of input signal while including all of the basic characteristics of the first exemplary embodiment.

As referred in FIG. 7, the SMK unit may include a filter filtering the input electric signal, an RFIC, and an RF antenna receiving RF signals transmitted from an MCU and the fob key, and an LF transmitter transmitting an LF signal to the fob key, and the fob key may include an LF receiver, an LFIC, the MCU, an RFIC, a filter, a power amplifier, an RF transmitter, and a plurality of switches.

The method for preventing the relay attack of the smart key of the vehicle according to the third exemplary embodiment includes a challenge signal transmitting operation S11 and a challenge signal receiving operation S12 (hereinafter, collectively referred to as a "challenge signal transceiving operation"), in which when an electric signal according to the triggering of the door handle or the operation of the switch is input into the SMK unit, the SMK unit transmits a modulated/demodulated challenge signal and then the fob key receives the modulated/demodulated challenge signal, and a response signal transmitting operation S15 and a response signal receiving operation S16 (hereinafter, collectively referred to as a "response signal transceiving operation"), in which the fob key transmits a response signal including predetermined information to the SMK unit with a predetermined output level in a form of a response to the challenge signal of the SMK unit, and the SMK unit receives the response signal after the challenge signal transceiving operation S11 and S12.

Here, the response signal transceiving operation S15 and S16 includes a signal determining process S16 of determining whether the signal input into the SMK unit is an LF signal generated by the triggering of the door handle or an RF signal generated according to the operation of the switch of the fob key.

The method for preventing the relay attack of the smart key of the vehicle according to the third exemplary embodiment has a main point that an output level of the response signal is controlled to be different when the fob key transmits the response signal to the SMK unit in the response signal transceiving operation S15 and S16 according to the signal determined in the signal determining process S16.

This is because that when the SMK unit receives the RF signal generated according to the operation of the switch, it is highly probable that a lawful user operates the rightful fob key while carrying the lawful fob key in a state of substantially securing a visible distance of the vehicle, but when the SMK unit receives the LF signal generated by the triggering of the door handle, it is difficult to secure justification of the carrier of the fob key. Accordingly, when the LF signal generated by the triggering of the door handle is input into the SMK unit, on an assumption that the carrier of the fob key secures the visible distance, it is preferable to perform an operation of a functional operation unit to be subsequently performed.

The third exemplary embodiment of the present invention has a main configuration that, particularly, when the LF signal is input into the SMK unit, an output level of the response signal is decreased compared to the case where the RF signal generated according to the operation of the switch is input into the SMK unit, so that the response signal reaches the SMK unit only within a predetermine distance.

In the response signal transceiving operation S15 and S16, the output level of the response signal may be controlled by an adjusting unit (not illustrated) adjusting a gain of the power amplifier provided in the fob key. A state, in which the output level of the response signal is controlled according to the kind of signal input into the SMK unit by using the adjusting unit will be described in detail below.

First, the adjusting unit adjusts a gain of the power amplifier so that the response signal is output with a predetermined output (hereinafter, referred to as "a first output value") when the input signal is the RF signal by the operation of the switch, and the adjusting unit adjusts a gain of the power amplifier so that the response signal is output with a second output value, which is smaller than the first output value, when the input signal is the LF signal by the triggering of the door handle.

The first output value corresponding to the predetermined output is a normal output level, with which the response signal is generally output when a current voltage level of the fob key is maintained in a normal level. That is, in the present invention, when the signal input into the SMK unit is determined to be the RF signal by the operation of the switch, the output level of the response signal in the normal case is maintained, so that even if the spaced distance between the vehicle and the fob key is long, the functional operation unit of the vehicle is operable. However, when the signal input into the SMK unit is determined to be the LF signal by the triggering of the door handle, it is possible to decrease a reaching distance of the response signal, and enable the carrier of the fob key to reflectively secure the visual distance of the vehicle by the decreased reaching distance by lowering the output level of the response signal than that of the case where the signal input into the SMK unit is determined to be the RF signal by the operation of the switch.

Here, the response signal transceiving operation S15 and S16 further includes a voltage level monitoring process S16" of monitoring a current VL of the fob key.

The current VL obtained in the voltage level monitoring process S16" is for the purpose of compensating for the reaching distance of the response signal, which is actually varied according to the VL.

That is, in the present invention, the predetermined output (the first output value) may be set to be in inverse proportion to the VL obtained in the voltage level monitoring process S23.

More particularly, when the VL is smaller than the predetermined VL and the input signal is the RF signal by the operation of the switch, the adjusting unit may adjust a gain of the power amplifier so that the response signal is output with a value (a first-a output value) larger than the first output value.

Further, when the VL is smaller than the predetermined VL and the input signal is the LF signal by the triggering of the door handle, the adjusting unit may adjust a gain of the power amplifier so that the response signal is output with a value (a second-a output value) larger than the second output value.

Here, the value (the second-a output value) larger than the second output value may be controlled to be a value smaller than the first output value. More preferably, the value (the second-a output value) larger than the second output value may be set to an intermediate value of the first output value and the second output value.

After performing the response signal transceiving operation S15 and S16, the SMK unit operates the corresponding various functional operation units of the vehicle according to a data demand included in the signal after decoding the input signal.

As described above, the method for preventing the relay attack of the smart key system according to the third exemplary embodiment enables the carrier of the fob key secure the visible distance of the vehicle at least by monitoring the current VL of the fob key, determining a signal input into the SMK unit, and effectively adjusting an output level of the response signal according to the signal, thereby advantageously preventing a probability of robbery of the vehicle and equipment stored inside the vehicle.

In a case of the first exemplary embodiment, unlike a case where it is determined whether to perform the response signal transmitting operation S15 by determining whether the noise signal II is included in the challenge signal received in the challenge signal receiving operation S12, but in a case of the third exemplary embodiment, the output level of the response signal output in the response signal transmitting operation S15 is effectively adjusted according to the kind of input signal regardless of the challenge signal receiving operation S12, thereby preventing a third party from breaking into the vehicle.

Figure 10:
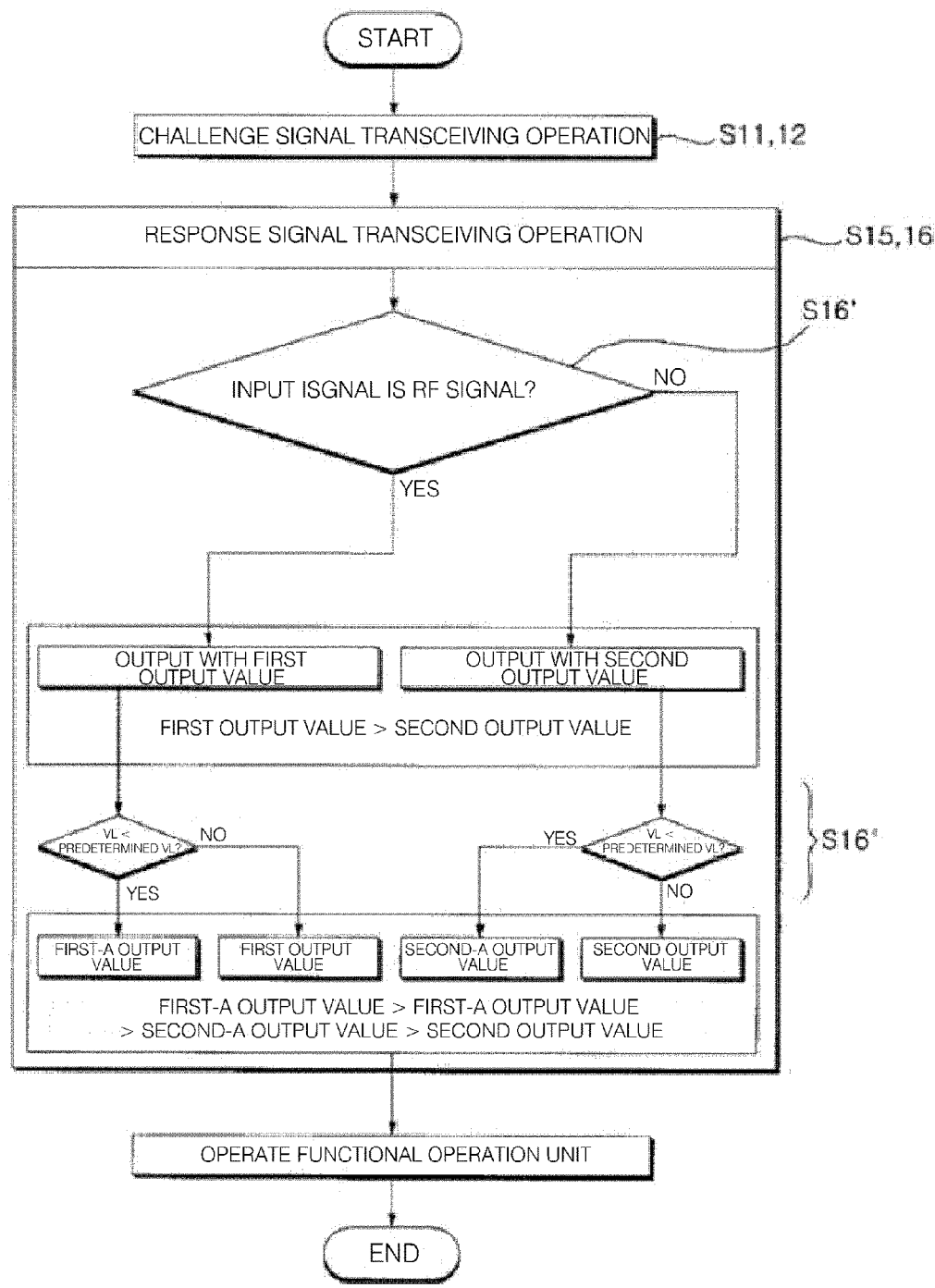
FIG. 10 is a block diagram illustrating a process of controlling the method for preventing the relay attack of the smart key system for the vehicle according to a second exemplary embodiment.

An operation process of the method for preventing the relay attack of the smart key system according to the third exemplary embodiment configured as described above will be briefly described with reference to the accompanying drawings (particularly, FIG. 10).

First, as referred in FIG. 8, when a carrier carrying a fob key operates a switch provided in the fob key or a carrier carrying a fob key or a third party triggers a side door handle of a vehicle, the SMK unit transmits a challenge signal to the fob key, and the fob key performs the challenge signal transceiving operations S11 and S12 of receiving the challenge signal.

Next, the response signal transceiving operation S15 and S16, in which the fob key receiving the challenge signal transmits a response signal to the SMK unit in a form of a response to the challenge signal, and the SMK unit receives the response signal, is performed.

Here, the response signal transceiving operation S15 and S16 further includes the signal determining process S16' of determining whether the input signal is generated by the LF signal by the triggering of the door handle or the RF signal according to the operation of the switch, and the voltage level monitoring process S16" of continuously monitoring a current VL of the fob key.

When the input signal is generated by the RF signal by the operation of the switch of the fob key, the fob key controls an output value of the response signal to have the predetermined output (the first output value) by using the adjusting unit.

However, when the input signal is generated by the LF signal by the triggering of the door handle, the fob key controls the output value of the response signal to have the second output value smaller than the first output value by using the adjusting unit.

In the meantime, even in a case where the input signal is generated by the RF signal by the operation of the switch of the fob key, when the current VL of the fob key is determined to be smaller than the predetermined VL through the voltage level monitoring process S23, the fob key may control the output value of the response signal to have the output value (the first-a output value) larger than the first output value by using the adjusting unit.

Further, even in a case where the input signal is generated by the LF signal by the triggering of the door handle, when the current VL of the fob key is determined to be smaller than the predetermined VL through the voltage level monitoring process S23, the fob key may control the output value of the response signal to have the output value (the second-a output value) larger than the second output value by using the adjusting unit.

Here, the first-a output value may be set to the value larger than the first output value and the second-a output value may be set to the value smaller than the first output value, and more preferably, the second-a output value may have an intermediate value of the first output value and the second output value.

When the response signal is transmitted from the fob key with each controlled output level, and the SMK unit receives the response signal, the SMK unit operates the various functional operation units of the corresponding signal.

As described above, in the method for preventing the relay attack of the smart key system according to the third exemplary embodiment, the response signal of the fob key is not unconditionally relay-attacked to the SMK unit, but an output level of the response signal is adjusted according to the current VL of the fob key and the kind of signal input into the SMK unit, so that when the carrier of the fob key does not secure a visible distance, at which the carrier is capable of viewing the vehicle, the relay attack is avoided, thereby preventing robbery of the vehicle and equipment stored in the vehicle.

A fourth exemplary embodiment of the method for preventing the relay attack of the smart key system for the vehicle according to the present invention provides a means for preventing a third party from breaking into a vehicle, which is further improved compared to the basic concept of the first exemplary embodiment.

More particularly, the method for preventing the relay attack of the smart key system for the vehicle according to the fourth exemplary embodiment further has, particularly, a main characteristic that the response signal transmitted in the response signal transmitting operation S15 is divided in a plurality of packet units and then is transmitted to the SMK unit through a plurality of channels, while including all of the basic characteristics of the first exemplary embodiment.

When some of the plurality of packet units received in the response signal receiving operation S16 are omitted, the first attack signal detecting operation S17 or the second decoding operation is not performed.

This is a process actually performed before the first attack signal detecting operation S18, and may establish a more enhanced system for preventing a third party from breaking into a vehicle than the case where the noise signal I included in the response signal is detected through the first attack signal detecting operation S18.

Particularly, the response signal is divided in the plurality of packet units and transmitted through the plurality of channels, so that when even any one of the response signals in the packet unit is omitted, the SMK unit senses the omission of the response signal and sets the performance of a next operation to be rejected, and thus the first attack signal detecting operation S18 is not actually performed, thereby finally preventing a third party having an unlawful intention from breaking into the vehicle.

The response signal in each packet unit may include channel information for the response signal in the packet unit to be subsequently transmitted, and a channel, in which the response signal in the packet unit to be subsequently transmitted is to be received, may be configured to stand by the reception of the response signal.

That is, when the respective channel information is not combined, the response signals in the plurality of packet units may be determined to be incomplete, and in this case, a next operation is not performed.

In the meantime, in the fourth exemplary embodiment of the method for preventing the relay attack of the smart key system for the vehicle according to the present invention, the present invention has been described on an assumption that the plurality of channels includes three channels and the response signal in each packet unit is transmitted through each channel as referred in FIG. 3, but the present invention is not essentially limited to the number as a matter of course.

According to the various exemplary embodiments of the method for preventing the relay attack of the smart key system for the vehicle according to the present invention configured as described above, when the two repeaters 10 and 20 attempting to break into the vehicle are provided, it is possible to create the effects of completely incapacitating the two repeaters 10 and 20 by increasing a distance limit, in which the SMK unit and the fob key may communicate with the operation of relaying communication of data transceived through the communication between the SMK unit and the fob key.

The various exemplary embodiments of the present invention may configure an independent system by each of the various exemplary embodiments, and the most appropriate various exemplary embodiments may be configured by combining the various exemplary embodiments.

In the above, various exemplary embodiments of the method for preventing the relay attack of the smart key system for the vehicle according to the present invention has been described in detail with reference to the accompanying drawings. However, the exemplary embodiments of the present invention are not necessarily limited by the aforementioned preferred exemplary embodiments, and it would be appreciated that various modifications and equivalent exemplary embodiments may be made by those skilled in the art. Accordingly, it should be understood that the true scope of the present invention shall be defined by the claims to be disclosed below.

The invention claimed is:

1. A method for preventing a relay attack of a smart key system for a vehicle, the method comprising:
   receiving, by a fob key configured to be carried by a user, a challenge signal applied from a smart key (SMK) unit installed in a vehicle;
   transmitting, by the fob key, a response signal including an encoding code to the SMK unit after the receiving the challenge signal;
   receiving, by the SMK unit, the response signal after the transmitting the response signal;
   detecting a noise signal included in the response signal received by the SMK unit after the receiving the response signal; and
   controlling operation of various functional units installed in the vehicle according to a decoding result based on the detecting the noise signal,
   wherein the noise signal is generated on account of a first repeater and a second repeater positioned between the SMK unit and the fob key, wherein the second repeater is positioned closer to the fob key than the first repeater,
   wherein the noise signal is a signal, which is transmitted for the purpose of being transmitted to the fob key from a transmission antenna of the second repeater and directly received in a reception antenna of the second repeater without passing through the fob key, and
   wherein the controlling operation of the various functional units includes blocking an operation of the various functional units installed in the vehicle to prevent a relay attack when the response signal received in the SMK unit includes the noise signal.

2. The method of claim 1, further comprising:
   decoding, by the fob key, a received modulated and demodulated signal of the challenge signal after the receiving the challenge signal;
   decoding, by the SMK unit, the received response signal after the receiving the response signal; and
   authorizing a user based on calculating a current spaced distance between the vehicle and the fob key, and then determining whether a passive operation signal applied from a door of the vehicle, other than the fob key, is normal by using a decoding result of the decoding, by the SMK unit,
   wherein the response signal is a signal having information on a received signal strength indicator (RSSI) and a current voltage level (VL) of the fob key.

3. The method of claim 2, wherein the response signal further includes an encoding code transmitted by the fob key for authenticating an authorized user.

4. The method of claim 3, wherein in the authenticating the authorized user, the VL includes information about a case where the VL is equal to or larger than a predetermined voltage and a case where the VL is smaller than the predetermined voltage, and the RSSI includes information about a case where the RSSI is equal to or larger than a predetermined indicator and a case where the RSSI is smaller than the predetermined indicator.

5. The method of claim 4, wherein in the authenticating the authorized user, the predetermined indicator (hereinafter, referred to as "a first predetermined indicator") of the RSSI when the VL is equal to or larger than the predetermined voltage has a larger value than that of the predetermined indicator (hereinafter, referred to as "a second predetermined indicator") of the RSSI when the VL is smaller than the predetermined voltage.

6. The method of claim 5, wherein the current spaced distance is calculated as a short (near) distance when the RSSI is equal to or larger than the first predetermined indicator or the second predetermined indicator, and a long (far) distance when the RSSI is smaller than the first predetermined indicator or the second predetermined indicator, and
in the authenticating the authorized user, only when the current spaced distance is calculated as the short (near) distance, the passive operation signal is determined to be normal, and when the current spaced distance is calculated as the long (far) distance, the passive operation signal is determined to be abnormal.

7. The method of claim 1, wherein the detecting the noise signal includes detecting a signal, which is the same kind as that of the response signal transmitted by the SMK unit, but does not have the encoding code, as the noise signal.

8. The method of claim 7, wherein the noise signal has the same frequency band as that of the response signal.

9. The method of claim 1, wherein the transmission antenna of the second repeater is a transmission antenna of the challenge signal, and
the reception antenna of the second repeater is a reception antenna of the response signal.

10. The method of claim 1, further comprising:
detecting a second noise signal included in the challenge signal received by the fob key after the receiving the challenge signal by the fob key and before the transmitting the response signal by the fob key.

11. The method of claim 10, wherein the detecting the second noise signal includes detecting a signal, which is the same kind as that of the challenge signal transmitted by the SMK unit, but has the encoding code, as the noise signal.

12. The method of claim 10, wherein the second noise signal has the same frequency band as that of the challenge signal.

13. The method of claim 12, wherein the second noise signal detected in is a signal, which is transmitted for the purpose of being transmitted to the SMK unit from a first transmission antenna of the first repeater and directly received in a first reception antenna.

14. The method of claim 13, wherein the first transmission antenna of the first repeater is a transmission antenna of the response signal, and
the first reception antenna of the first repeater is a reception antenna of the challenge signal.

15. The method of claim 14, wherein in the transmitting, by the fob key, the response signal including the encoding code to the SMK unit, when the challenge signal received in the fob key includes the second noise signal, the response signal is not transmitted.

16. The method of claim 1, wherein the receiving, by the SMK unit, includes determining whether the challenge signal received in the SMK unit is generated by an LF signal generated by triggering of a door handle or an RF signal input by an operation of a plurality of switches provided in the fob key, in which an output level of the response signal is controlled to be different according to the kind of input signal.

17. The method of claim 16, wherein the output level of the response signal is controlled by an adjusting unit, which adjusts a gain of a power amplifier provided in the fob key.

18. The method of claim 17, wherein the adjusting unit adjusts a gain of the power amplifier so that the response signal is output with a predetermined output (hereinafter, referred to as "a first output value") when the input signal is the RF signal by the operation of the switch, and the adjusting unit adjusts a gain of the power amplifier so that the response signal is output with a second output value, which is smaller than the first output value, when the input signal is the LF signal by the triggering of the door handle.

19. The method of claim 18, wherein the receiving, by the SMK unit, includes a voltage level monitoring process of monitoring a current voltage level (VL) of the fob key, and
the first output value is set to be in inverse proportion to the VL obtained in the voltage level monitoring process.

20. The method of claim 19, wherein when the VL is smaller than the predetermined VL and the input signal is the RF signal by the operation of the switch, the adjusting unit adjusts a gain of the power amplifier so that the response signal is output with a value larger than the first output value.

21. The method of claim 19, wherein when the VL is smaller than the predetermined VL and the input signal is the LF signal by the triggering of the door handle, the adjusting unit adjusts a gain of the power amplifier so that the response signal is output with a value larger than the second output value.

22. The method of claim 21, wherein the value larger than the second output value is smaller than the first output value.

23. The method of claim 21, wherein the value larger than the second output value is an intermediate value of the first output value and the second output value.

24. The method of claim 1, wherein the transmitting the response signal, by the fob key, includes an operation of dividing, by the fob key, the response signal including the encoding code in a plurality of packet units and then transmitting the response signal to the SMK unit through a plurality of channels.

25. The method of claim 24, wherein when some of the plurality of packet units received are omitted, a next operation is not performed.

26. The method of claim 25, wherein the response signal in each packet unit includes channel information for the response signal in the packet unit to be subsequently transmitted, and a channel, in which the response signal in the packet unit to be subsequently transmitted is to be received, stands by the reception of the response signal.

* * * * *